(12) United States Patent
Peck et al.

(10) Patent No.: US 11,311,861 B2
(45) Date of Patent: Apr. 26, 2022

(54) ZINC DOPED MANGANESE-IRON SPINEL CATALYST MATERIAL AND METHOD OF MAKING AND USING THE SAME

(71) Applicant: Toyota Motor Engineering & Manufacturing North America, Inc., Plano, TX (US)

(72) Inventors: Torin C. Peck, Ann Arbor, MI (US); Benjamin A. Grayson, Whitmore Lake, MI (US); Blake A. Graham, Royal Oak, MI (US); Charles A. Roberts, Farmington Hills, MI (US); Krishna R. Gunugunuri, Canton, MI (US)

(73) Assignee: TOYOTA MOTOR ENGINEERING AND MANUFACTURING NORTH AMERICA, INC., Plano, TX (US)

( * ) Notice: Subject to any disclaimer, the term of this patent is extended or adjusted under 35 U.S.C. 154(b) by 83 days.

(21) Appl. No.: 16/847,298

(22) Filed: Apr. 13, 2020

(65) Prior Publication Data

US 2021/0316281 A1    Oct. 14, 2021

(51) Int. Cl.

| | |
|---|---|
| *B01D 53/94* | (2006.01) |
| *B01J 21/00* | (2006.01) |
| *B01J 21/04* | (2006.01) |
| *B01J 23/10* | (2006.01) |
| *B01J 23/889* | (2006.01) |
| *B01J 37/02* | (2006.01) |
| *B01J 37/03* | (2006.01) |
| *B01J 37/04* | (2006.01) |
| *B01J 37/08* | (2006.01) |
| *F01N 3/10* | (2006.01) |

(52) U.S. Cl.
CPC ...... *B01J 23/8892* (2013.01); *B01D 53/9413* (2013.01); *B01J 21/005* (2013.01); *B01J 21/04* (2013.01); *B01J 23/10* (2013.01); *B01J 37/0236* (2013.01); *B01J 37/031* (2013.01); *B01J 37/04* (2013.01); *B01J 37/088* (2013.01); *F01N 3/10* (2013.01); *B01D 2255/2073* (2013.01); *B01D 2255/20738* (2013.01); *B01D 2255/20792* (2013.01); *B01D 2255/908* (2013.01)

(58) Field of Classification Search
CPC .............. B01D 53/94; B01D 2255/405; B01D 2255/908; B01D 2257/104; B01D 2258/012; B01D 2258/014; B01J 23/005; B01J 37/03; B01J 37/031; F01N 3/0864; F01N 2250/12; F01N 2570/16
See application file for complete search history.

(56) References Cited

U.S. PATENT DOCUMENTS

| | | | |
|---|---|---|---|
| 5,227,145 A | 7/1993 | Kintaichi et al. | |
| 8,853,121 B1 | 10/2014 | Nazarpoor et al. | |
| 8,900,420 B2 | 12/2014 | Veeraraghavan et al. | |
| 9,216,409 B2 | 12/2015 | Nazarpoor et al. | |
| 9,511,358 B2 | 12/2016 | Nazarpoor et al. | |
| 2017/0326533 A1 | 11/2017 | Nazarpoor et al. | |

FOREIGN PATENT DOCUMENTS

EP    3 461 264 A1 *  4/2019  .............. B01J 23/83

OTHER PUBLICATIONS

D. Varshney, "Structural and vibrational properties of $Zn_xMn_{1-x}Fe_2O_4$ (x = 0.0, 0.25, 0.50, 0.75, 1.0) mixed ferrites", Materials Chemistry and Physics, Dec. 2011, pp. 413-419, vol. 131, Issues 1-2, School of Physics, Devi Ahilya University, Indore, India.

S. Debnath and R. Das, "Study of the optical properties of Zn doped Mn spinel ferrite nanocrystals shows multiple emission peaks in the visible range—a promising soft ferrite nenomaterial for deep blue LED", Journal of Molecular Structure 1199 (2020) 127044.

* cited by examiner

*Primary Examiner* — Timothy C Vanoy

(74) *Attorney, Agent, or Firm* — Jordan IP Law, LLC

(57) ABSTRACT

Catalyst for oxygen storage capacity applications that include a zinc doped manganese-iron spinel mixed oxide material. The zinc doped manganese-iron spinel mixed oxide material may be synthesized by a co-precipitation method using a precipitation agent such as sodium carbonate and exhibits a high oxygen storage capacity.

19 Claims, 11 Drawing Sheets

ZINC DOPED MANGANESE-IRON SPINEL CATALYST MATERIAL AND METHOD OF MAKING AND USING THE SAME

TECHNICAL FIELD

The present disclosure generally relates to zinc doped manganese-iron spinel mixed oxide catalyst materials for vehicle emissions purification, and methods of making and using the same.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

NOx emissions regulations are becoming increasingly stringent in the 21st century as they contribute significantly to global pollution and can have a negative impact on human health. Thus, there is a desire for materials for vehicle emissions purification, and more specifically, for the development of materials with high Oxygen Storage Capacity (OSC), suitable to improve fuel economy for lean burn and stoichiometric (3-way) engines while maintaining high purification of NO, unburned hydrocarbons, and CO.

SUMMARY

This section provides a general summary of the disclosure and is not a comprehensive disclosure of its full scope or all of its features.

In various aspects, the present disclosure provides a catalyst for oxygen storage applications comprising a zinc doped manganese-iron spinel mixed oxide material obtained by a co-precipitation method using a precipitation agent.

In another aspect, the present disclosure provides a method for making a zinc doped manganese-iron spinel mixed oxide material by a co-precipitation method using a sodium carbonate ($Na_2CO_3$) precipitation agent.

In another aspect, the present disclosure provides a method of treating an exhaust gas from an internal combustion engine comprising contacting the exhaust gas with a zinc doped manganese-iron spinel mixed oxide material obtained by a co-precipitation method using sodium carbonate ($Na_2CO_3$) as a precipitation agent.

In another aspect, the present disclosure provides a catalytic converter, which comprises a catalyst arranged in a chamber for direct decomposition removal of $NO_x$ from exhaust gas stream, wherein the catalyst comprises a zinc doped manganese-iron spinel mixed oxide material obtained by a co-precipitation method using sodium carbonate ($Na_2CO_3$) as a precipitation agent.

The zinc doped manganese-iron spinel mixed oxide material obtained by a co-precipitation method using sodium carbonate ($Na_2CO_3$) as a precipitation agent of the present disclosure employs earth abundant elements which may be locally procured. The zinc doped manganese-iron spinel mixed oxide material has enhanced thermal stability, improved utilization of the metal/metal oxide component, i.e., a higher ratio of oxygen uptake per metal atom, and high OSC before and after aging at high temperatures, such as 1000° C. These advantageous properties of the zinc doped manganese-iron spinel mixed oxide material of the present disclosure such as efficient utilization of the metal component leading to increased OSC on a per metal basis allows for operation of a catalytic converter in a lean atmosphere to maximize fuel efficiency.

Further areas of applicability and various methods of enhancing the above technology will become apparent from the description provided herein. The description and specific examples in this summary are intended for purposes of illustration only and are not intended to limit the scope of the present disclosure.

DRAWINGS

The present teachings will become more fully understood from the detailed description and the accompanying drawings wherein.

Figure 1:
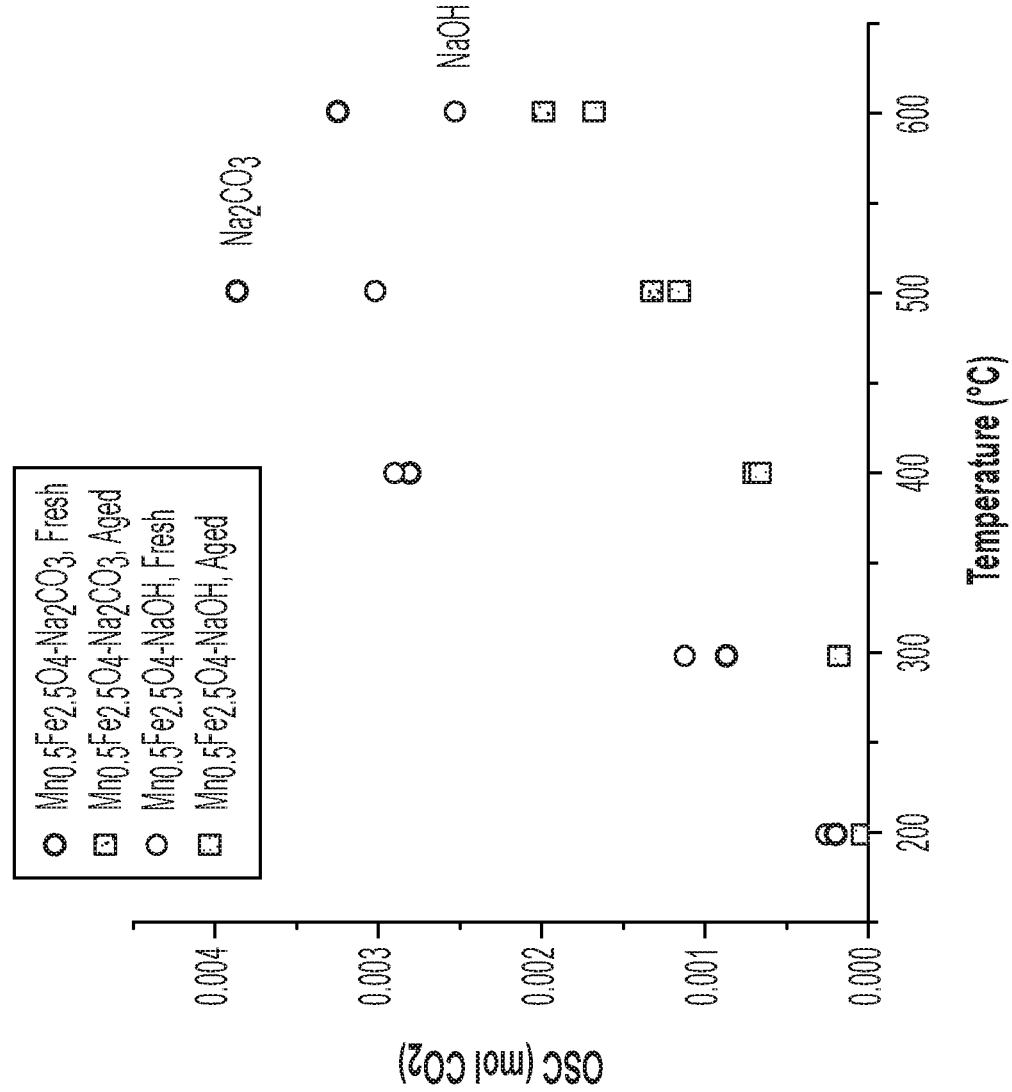
FIG. 1 illustrates OSC performance as a function of temperature over fresh and aged materials synthesized by NaOH or $Na_2CO_3$ precipitation.

It should be noted that the figures set forth herein are intended to exemplify the general characteristics of the methods, algorithms, and devices among those of the present technology, for the purpose of the description of certain aspects. These figures may not precisely reflect the characteristics of any given aspect and are not necessarily intended to define or limit specific embodiments within the scope of this technology. Further, certain aspects may incorporate features from a combination of figures.

DESCRIPTION

The present disclosure provides materials for vehicle emissions purification, more specifically the materials have high OSC and are suitable for improving fuel economy for lean burn and stoichiometric (3-way) engines while maintaining high purification of NO, unburned hydrocarbons, and CO. More specifically, the present disclosure relates to a catalyst for oxygen storage applications comprising a zinc doped manganese-iron spinel mixed oxide material obtained by a co-precipitation method using a precipitation agent, and methods of making and using the same.

Some metal oxides can reversibly store/release oxygen or control the oxygen concentration in the gas phase in response to changes in the temperature and oxygen partial pressure. Ceria ($CeO_2$) is generally used as an oxygen storage material in automotive exhaust catalysis in order to maintain the high purification efficiency by precisely controlling the oxygen partial pressure. Cerium-zirconium composite oxides are widely used as oxygen storage components due to their oxygen storage/release property and good hydrothermal stability. The oxygen storage/release capacity (OSC) of $CeO_2$ corresponding to the redox reaction between $Ce^{3+}$ and $Ce^{4+}$ is greatly enhanced by Zr substitution, reaching its maximum for $Ce_{0.5}Zr_{0.5}O_2$.

Composite oxides of cerium-zirconia with additional elements have been studied for improved performance properties. Incorporation of alumina into cerium-zirconium oxides reportedly has been shown to improve thermal resistance and oxygen storage/release property of the materials. Cerium zirconium mixed oxide, with a Ce:Zr ratio of 1:1 is currently used for vehicle emissions purification, and more specifically, for the development of materials with high Oxygen Storage Capacity (OSC), suitable to improve fuel economy for lean burn and stoichiometric (3-way) engines while maintaining high purification of NO, unburned hydrocarbons, and CO.

However, further improvements in performance and OSC are desired beyond current ceria-based materials. Specifically, the mechanisms of Ce-based materials utilize the reversible transition between $CeO_2$ and $Ce_2O_3$ oxidizing Ce from $3^+$ valence state to $4^+$ valence state ($Ce_2O_3+1/2 \leftrightarrow 2CeO_2$), with Zr acting as an inactive component. Performing such a reaction requires 2 moles of the Ce to uptake 1/2 moles of Oxygen gas (2 atoms Ce per 1 atom Oxygen). Since the ratio of Ce:Zr is 1:1, and the Zr is an inactive component, it follows that 4 atoms of metal, M, are required to uptake 1 atom of oxygen, O, i.e., a metal/metal oxide component M:O) ratio of 4:1. To improve lean burn efficiency, a better utilization of the active component, M, to the oxygen uptake is desired. In this regard, is desired. In this regard, a decrease of the M:O ratio from 4:1 represents a potential for improved OSC material performance with a M:O ratio of 1:1, being optimal.

Additionally, most of the world's cerium supply is mined in the ocean off the east coast of Japan and is continuously becoming more expensive on the open market. It is therefore desirable to utilize cheaper, more earth-abundant elements for OSC materials. Additionally, employing more locally-sourced materials undoubtedly yields advantages toward "just-in-time" procurement and utilization in vehicle parts manufacturing.

Earth-abundant elements utilized for OSC materials may include manganese, iron, and zinc. Manganese-iron mixed oxides form a spinel structure of the formula $Mn_xFe_{3-x}O_4$ which has excellent OSC prior to high temperature (i.e., 1000° C.) exposure. Due to the variety of valence states and phases available for both manganese ($2^+$, $3^+$, $4^+$) and iron oxides ($2^+$, $3^+$), it is possible to improve the utilization of the metal/metal oxide component, i.e., a higher ratio of O uptake per metal atom. For example, $3FeO+1/2O_2 \leftrightarrow Fe_3O_4$, where M:O=3:1, or $3MnO+1/2O_2 \leftrightarrow Mn_3O_4$ (3:1), followed by $Mn_3O_4+O_2 \leftrightarrow 3MnO_2$ (3:2); each of these reactions improve upon the M:O of 4:1 of the Ce-based materials. Therefore, more efficiently utilization of the metal component is possible by increasing the OSC on a per metal basis, which may lead to the ability to operate a catalytic converter in a lean atmosphere to maximize fuel efficiency.

However, $Mn_xFe_{3-x}O_4$ materials are prone to oxidation at high temperatures, such as those encountered in automotive exhaust, a condition in which the iron component is no longer stable in a spinel structure and forms $Fe_2O_3$. Too much $Fe_2O_3$ leads to poor reversibility between FeO, spinel, and $Fe_2O_3$. Additionally, Mn-based spinels ($Mn_3O_4$, hausmannite) are known to oxidize irreversibly to $Mn_2O_3$ (bixbyite).

The present inventors have developed a method involving zinc (Zn) doping to introduce zinc into the $Mn_xFe_{3-x}O_4$ structure, thereby stabilizing both Mn-based and Fe-based spinels after high temperature exposure, while maintaining a high oxygen storage capacity.

The present disclosure provides for the use of earth-abundant, inexpensive, and potentially locally procured zinc, iron, and manganese oxides to create a thermally-stable material with high OSC. Iron-manganese spinels are known to suffer from lack of phase stability at high temperature, leading to the more phase stable and less reversible phases of $Fe_2O_3$ or $Mn_2O_3$, respectively. The Zn doping minimizes the formation of these undesirable and unreactive phases, while promoting the formation of the easy to oxidize FeO phase during the oxygen storage evaluation procedure. Additional advantages over Ce-based oxygen storage materials are improved utilization of M:O, and potential for localized procurement and production.

Additionally, the present inventors discovered that the use of sodium carbonate ($Na_2CO_3$) as a precipitation agent produces materials with higher OSC before and after aging in air at high temperatures, such as in the range of 800-1100° C., and specifically 1000° C.

The present disclosure relates to a catalyst for oxygen storage applications comprising a zinc doped manganese-iron spinel mixed oxide material obtained by a co-precipitation method using a precipitation agent, such as sodium carbonate. In an exemplary embodiment, the zinc doped manganese-iron spinel mixed oxide material is obtained from a co-precipitation method employing sodium carbonate ($Na_2CO_3$) as the precipitation agent. Such zinc doped manganese-iron spinel mixed oxide materials are thermally stable and exhibit enhanced OSC performance. In an exemplary embodiment, the zinc doped manganese-iron spinel mixed oxide material comprises $Zn_xMn_{0.5}Fe_{2.5-x}O_4$, wherein $0 \leq x \leq 0.9$. In another exemplary embodiment $0.2 \leq x \leq 0.9$. In a further exemplary embodiment, x is 0.5.

In another exemplary embodiment, the zinc doped manganese-iron spinel mixed oxide material further comprises a support, which may be selected from the group consisting of $Al_2O_3$, $SiO_2$, and $TiO_2$. In another exemplary embodiment, the alumina support may be stabilized with a material such as lanthanum, zirconia, titania, alkaline earth metal oxides such as baria, calcia or strontia or, most usually, rare earth metal oxides, for example, oxides of cerium, lanthanum, neodymium, praseodymium and mixtures of two or more rare earth metal oxides, including the commercially available mixtures of rare earth metal oxides For example, the alumina support may be a lanthanum (La) stabilized $Al_2O_3$ support containing 1 to 5% lanthanum.

The zinc doped manganese-iron spinel mixed oxide materials may be synthesized by a co-precipitation method which comprises mixing manganese, iron and zinc precursor aqueous solutions; adding a precipitating agent, such as sodium carbonate ($Na_2CO_3$) to obtain a precipitate; drying the obtained precipitate; and calcining the dried precipitate. Suitable metal precursor solutions may be chlorides, acetates, and/or sulfates for each of manganese, iron and zinc.

For example, the required amounts of metal precursors, e.g., manganese nitrate, iron nitrate or Fe(II) chloride, and zinc nitrate, may be dissolved separately in water and the resulting solutions mixed together. A precipitating agent, such as, for example, $Na_2CO_3$, may be separately dissolved in water and the resulting precipitating agent solution added to the metal precursor solution in a dropwise fashion. The reactants may be stirred constantly until a desired pH, such as, for example, a pH of 9-13, and particularly 10-11, is reached. The supernatant liquid may be decanted and filtered to obtain a precipitate. The precipitate may be dried, ground into a fine powder and then calcined. Calcining may be at a temperature range which may be predetermined of from about 500-1000° C. for a time period which may be predetermined of about 2 to 50 hours and at a ramp rate which may be predetermined of about 1 to 20° C./min. In an exemplary embodiment, the catalyst is calcined at a temperature, which may be predetermined, such as 500° C. for 2 hours.

In one embodiment, the zinc manganese-iron spinel is deposited on a support such as a modified $Al_2O_3$ support via deposition co-precipitation, by first adding $Al_2O_3$ to water, dissolving metal precursors, and precipitating via $Na_2CO_3$ aqueous solution until pH 9-13 is achieved. The material is filtered with deionized water, dried at about 120° C. for about 12 hours, ground fine, and calcined at about 500-1000° C., ramping from ambient temperature at about 2° C./minute and dwell time of about 1-50 hours.

Additionally, the precipitation deposition could occur via the addition of modified $Al_2O_3$ to water, dissolution of $Na_2CO_3$ in water, and then the stoichiometric composition of Mn/Zn/Fe solution in water is added dropwise, followed by filtration, drying, and calcination.

In an exemplary embodiment, the manganese precursor solution comprises manganese nitrate ($Mn(NO_3)_2$). In another exemplary embodiment, the iron precursor solution is selected from iron nitrate ($Fe(NO_3)_3$ and Fe(II) chloride ($FeCl_2$). In another exemplary embodiment, the zinc precursor solution comprises zinc nitrate ($Zn(NO_3)_2$).

In another embodiment, there is disclosed a method of treating an exhaust gas from an internal combustion engine comprising contacting the exhaust gas with a zinc doped manganese-iron spinel mixed oxide material obtained by a co-precipitation method using sodium carbonate ($Na_2CO_3$) as a precipitation agent.

In an exemplary embodiment, the catalyst material comprises $Zn_xMn_{0.5}Fe_{2.5-x}O_4$, wherein $0 \leq x \leq 0.9$.

In another exemplary embodiment, the catalyst material comprises $Zn_xMn_{0.5}Fe_{2.5-x}O_4$, wherein $0.2 \leq x \leq 0.9$. In another exemplary embodiment, the catalyst material comprises $Zn_xMn_{0.5}Fe_{2.5-x}O_4$, wherein x is 0.5.

In yet another exemplary embodiment, the catalyst material further comprises a support selected from the group consisting of $Al_2O_3$, $SiO_2$, and $TiO_2$, particularly $Al_2O_3$ which may be stabilized by lanthanum.

In another embodiment, there is disclosed a catalytic converter, which comprises a body defining a chamber, wherein the body has an inlet to receive an exhaust gas stream into the chamber, and an outlet to allow the exhaust gas stream to exit the body. A catalyst is arranged in the chamber for direct decomposition removal of $NO_x$ from exhaust gas stream. The catalyst comprises a zinc doped manganese-iron spinel mixed oxide material obtained by a deposition co-precipitation method using sodium carbonate ($Na_2CO_3$) as a precipitation agent. In an exemplary embodiment the catalyst material comprises $Zn_xMn_{0.5}Fe_{2.5-x}O_4$, wherein $0 < x \leq 0.9$. In another exemplary embodiment the catalyst material comprises $Zn_xMn_{0.5}Fe_{2.5-x}O_4$, wherein $0.2 \leq x \leq 0.9$. In another exemplary embodiment, the catalyst material comprises $Zn_xMn_{0.5}Fe_{2.5-x}O_4$, wherein x is 0.5. In yet another exemplary embodiment the catalyst material further comprises a support selected from the group consisting of $Al_2O_3$, $SiO_2$, and $TiO_2$, particularly $Al_2O_3$ which may be stabilized by lanthanum.

EXAMPLES

Various aspects of the present disclosure are further illustrated with respect to the following examples. It is to be understood that these examples are provided to illustrate specific embodiments of the present disclosure and should not be construed as limiting the scope of the present disclosure in or to any particular aspect.

Synthesis

Materials of the composition $Mn_{0.5}Fe_{2.5}O_4$, and $Zn_xMn_{0.5}Fe_{2.5-x}O_4$ ($0 < x \leq 0.9$) were fabricated using a scalable and typical co-precipitation process. For example, stoichiometric quantities of high purity Mn, Fe, and Zn nitrates, along with Fe(II) chloride were dissolved in deionized water, with magnetic stirring to yield the precursor solution. A typical synthetic procedure targeted 5 grams yield of the catalyst and utilized 400 ml of deionized water. For the best-performing samples, a precipitation agent composed of approximately 14-15 grams $Na_2CO_3$ in 100 ml of deionized water was added to the precursor solution dropwise until complete precipitation of the cation component was achieved (pH 10-11), allowed to stir for another 30 minutes, and aged overnight. The performance of some materials prepared in this fashion were compared to those prepared using a precipitation agent composed of 100 ml of deionized water and 7 grams of semi-conductor grade NaOH (pH of composite was ~12 after addition), stirred for an additional 30 minutes and aged overnight. The precipitate was captured via vacuum filtration, and washed with 1500 ml deionized water to remove impurities such as residual Na. The precipitate was dried at 120° C. for 6-12 hours, ground finely via agate mortar and pestle, and calcined at 500° C. for 2 hours. The resulting materials were pressed into 9 μm pellets.

Characterization

For OSC evaluation, ~1 gram of each pelletized material was evaluated for OSC utilizing a Horiba Catalytic Convertor Automated Test System (CCATS) equipped with a Motor Exhaust Gas Analyzer (MEXA) for product detection. The pellets were loaded in the reactor test piece between two pieces of inert quartz wool. Next, the temperature was elevated to 200° C. within 5 minutes, and 5 cycles between exposure of 1% $O_2$, followed by 2% CO were conducted, monitoring the $CO_2$ production during CO pulses; the $CO_2$ production corresponds to the number of moles of oxygen 'stored' by the material. The temperature is then raised to 300, 400, 500 and 600° C., and at each temperature the OSC is evaluated in the same fashion as at 200° C. (alternate pulses of 2% CO and 1% $O_2$).

After the reaction, the materials were aged at 1000° C. for 5 hours in air. The resulting materials were once again evaluated for OSC, utilizing the same procedure outlined above.

X-Ray Diffraction was conducted over the 1000° C. aged samples before and after OSC evaluation, to understand the crystal structure(s)/material phase(s) present before and after use.

Performance Evaluation

The effect of the precipitation agent is demonstrated in FIG. 1. As shown in FIG. 1, samples synthesized using $Na_2CO_3$ as the precipitation agent show significant improvement in OSC performance of fresh materials and after aging in comparison to samples synthesized using NaOH as the precipitation agent.

Figure 2:
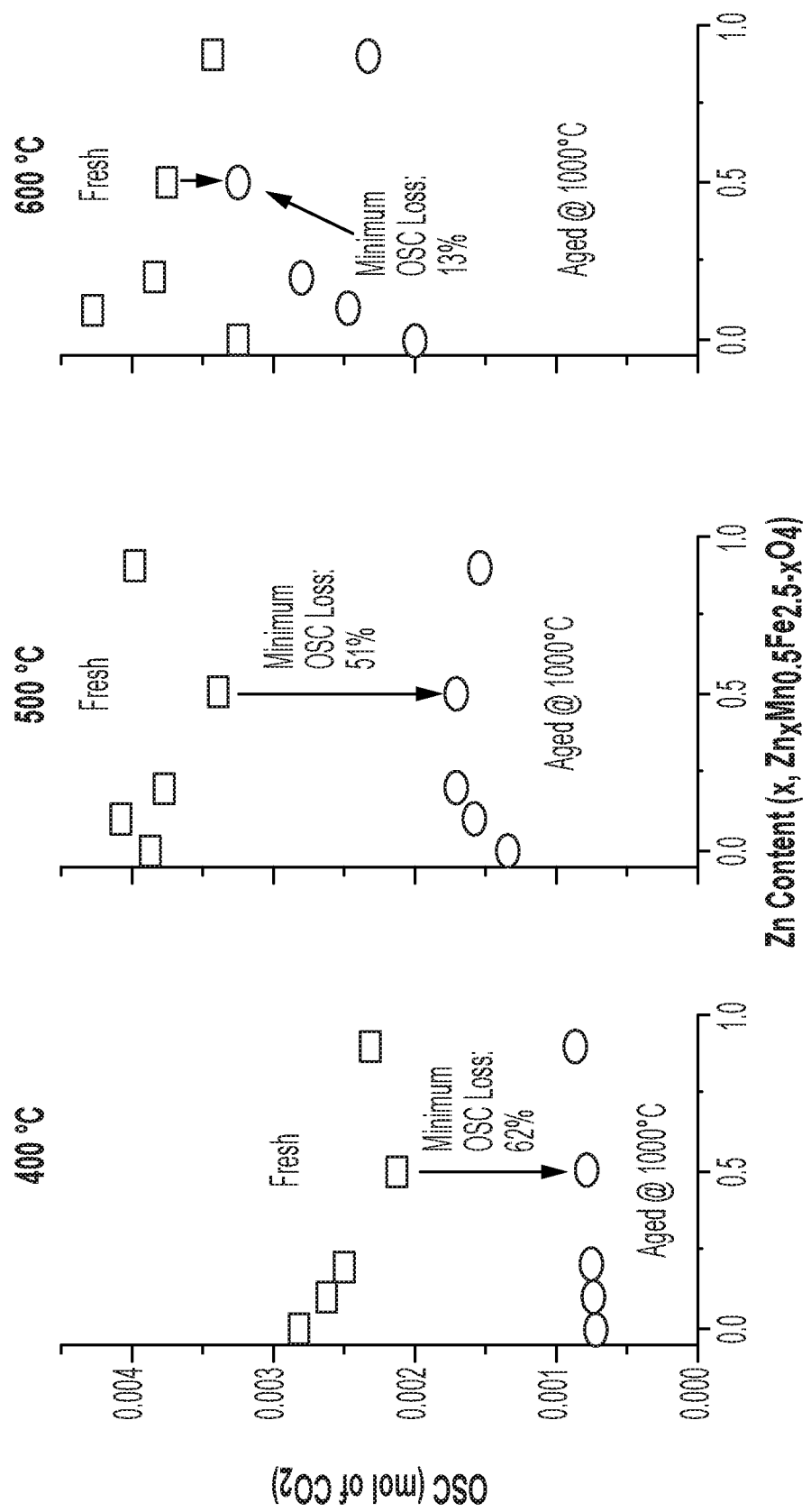
FIG. 2 illustrates OSC performance of fresh and aged samples as a function of Zn content at various temperatures from 400-600° C.
Figure 3:
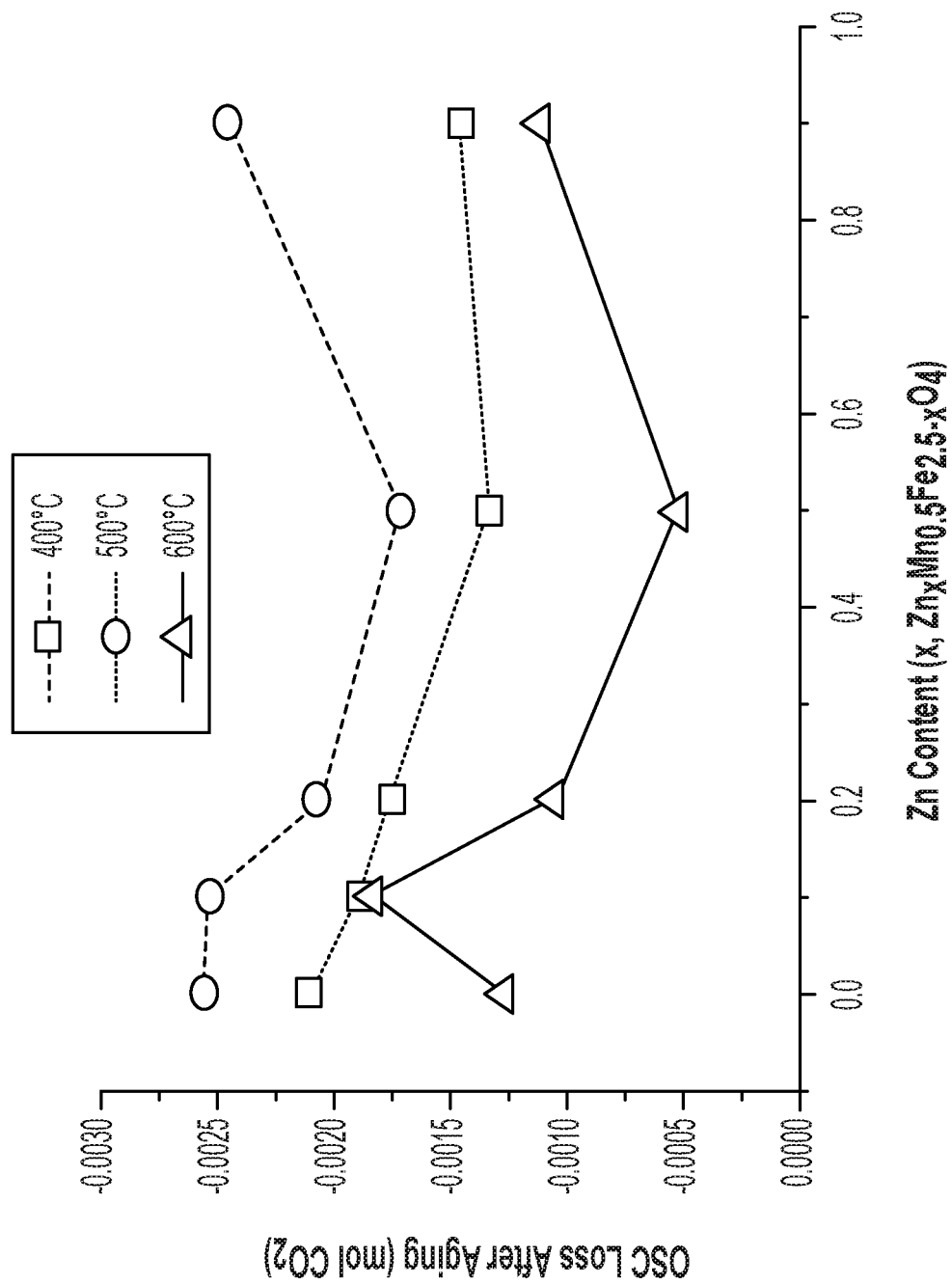
FIG. 3 illustrates OSC loss after aging at various temperatures from 400-600° C. as a function of Zn content.

The OSC performance of the materials before and after aging at various temperatures as a function of zinc content is shown in FIG. 2. In all cases after aging, samples with Zn performed better than samples without Zn. Additionally, samples with a zinc content in the range of from $0.2 \leq x \leq 0.9$ perform the best at each temperature, displaying the least OSC decrease after aging. Referring to FIG. 3, Zn=0.5 shows ideal results with respect to minimizing OSC loss after aging.

Figure 4:
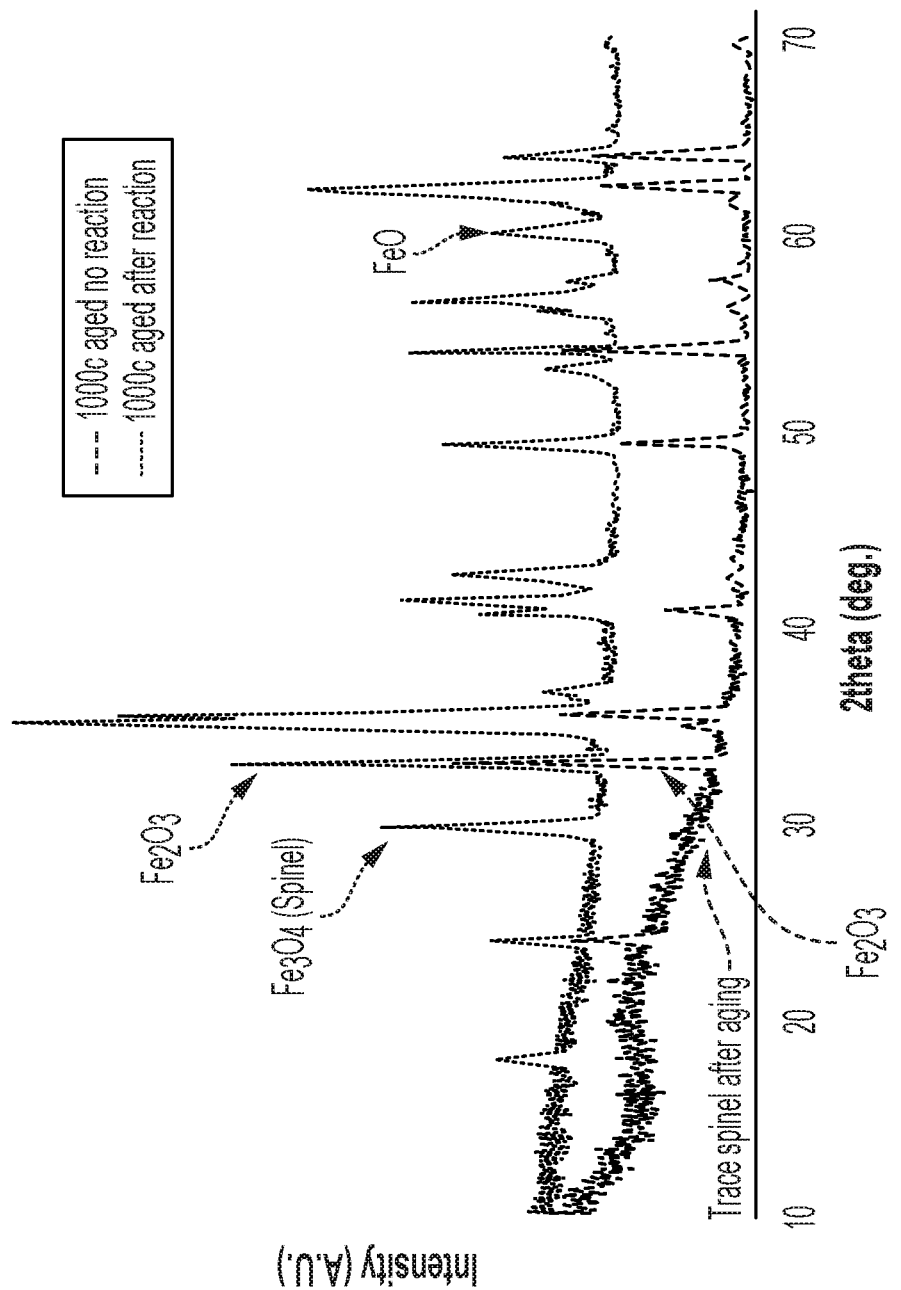
FIG. 4 illustrates the $Mn_{0.5}Fe_{2.5}O_4$ X-Ray Diffraction pattern after aging, before and after reaction.
Figure 5:
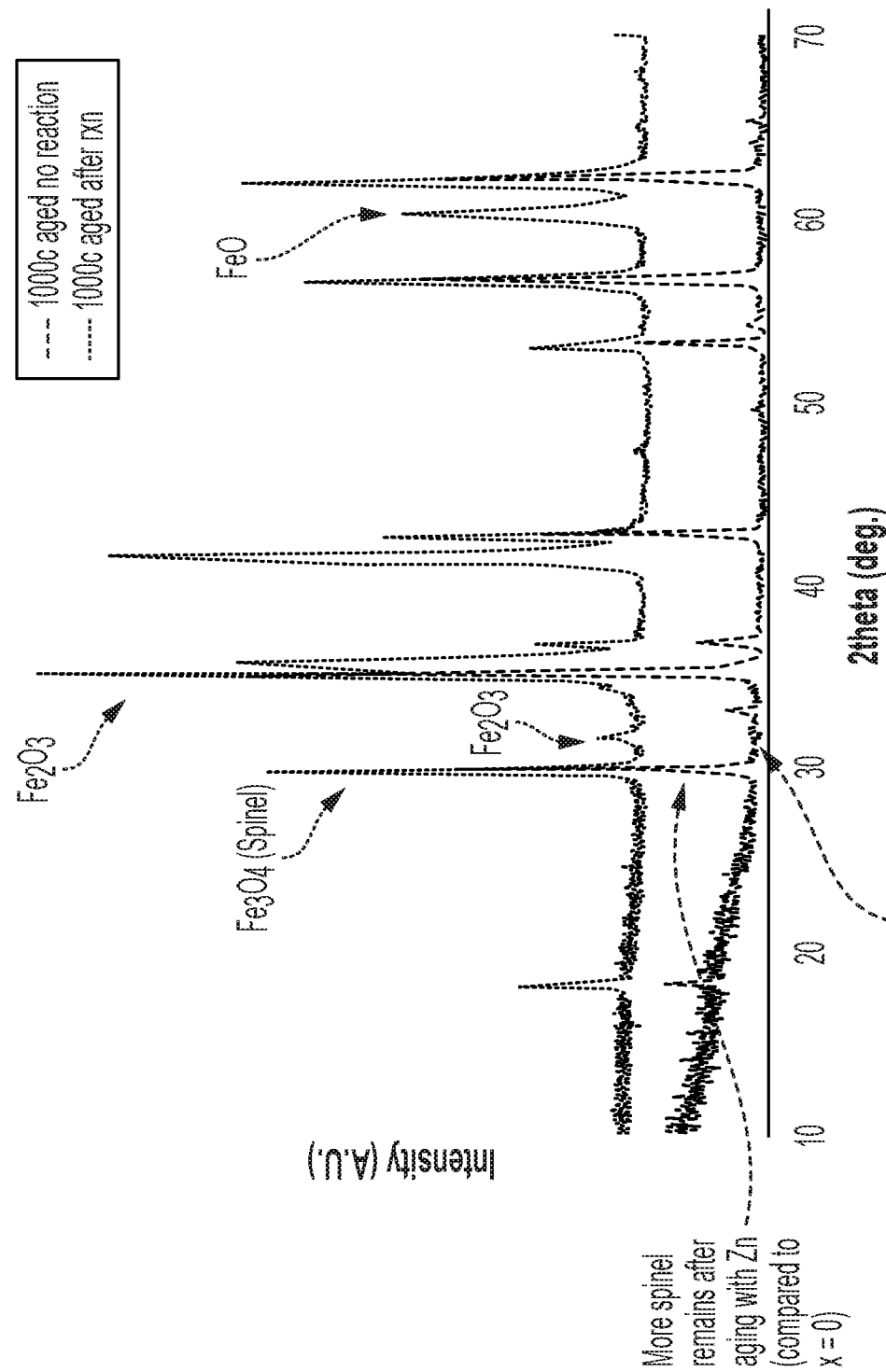
FIG. 5 illustrates the $Zn_{0.5}Mn_{0.5}Fe_{2.5}O_4$ X-Ray Diffraction pattern after aging, before and after reaction.
Figure 6:
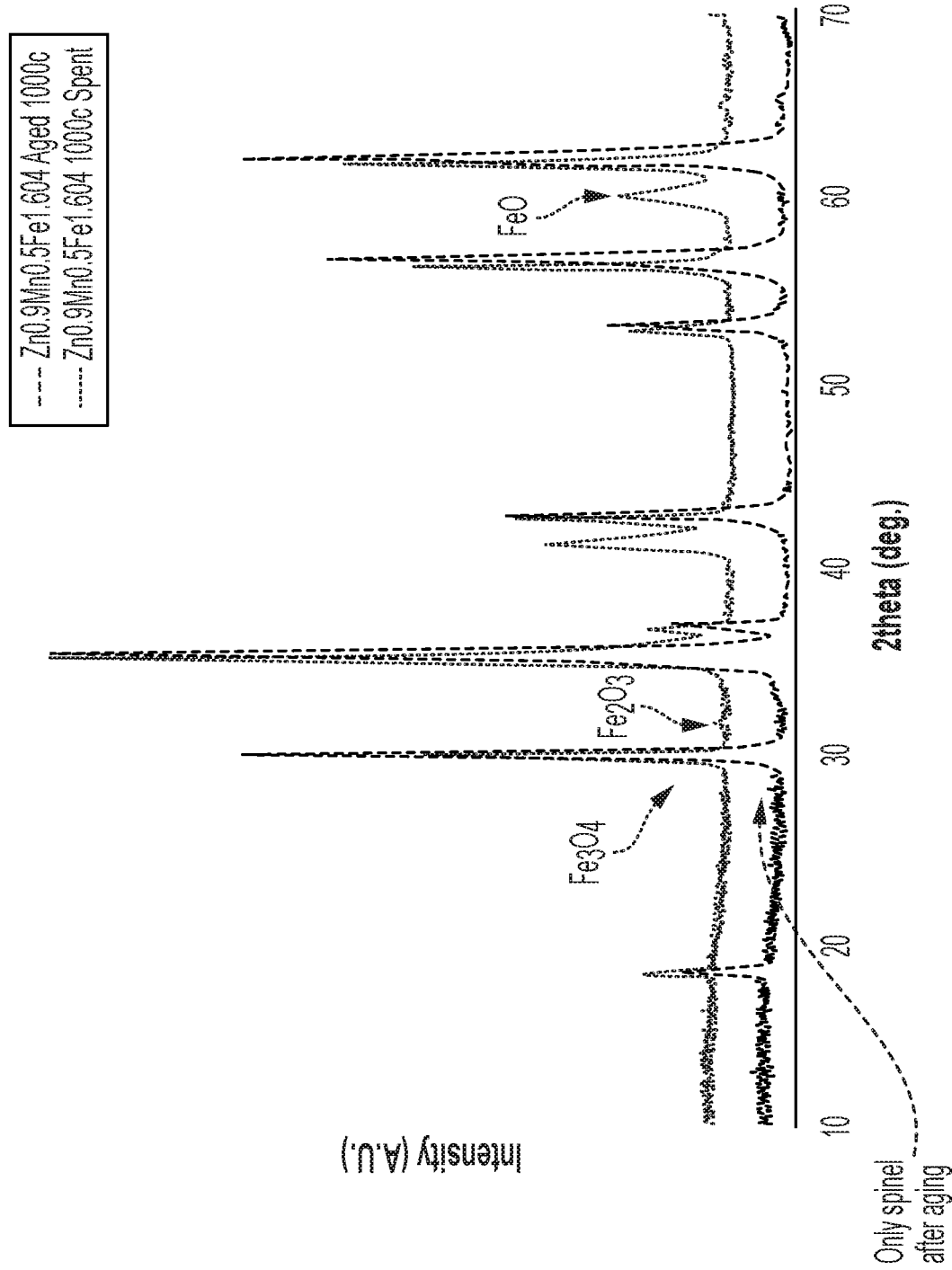
FIG. 6 illustrates the $Zn_{0.9}Mn_{0.5}Fe_{1.6}O_4$ X-Ray Diffraction pattern after aging, before and after reaction.
Figure 7:
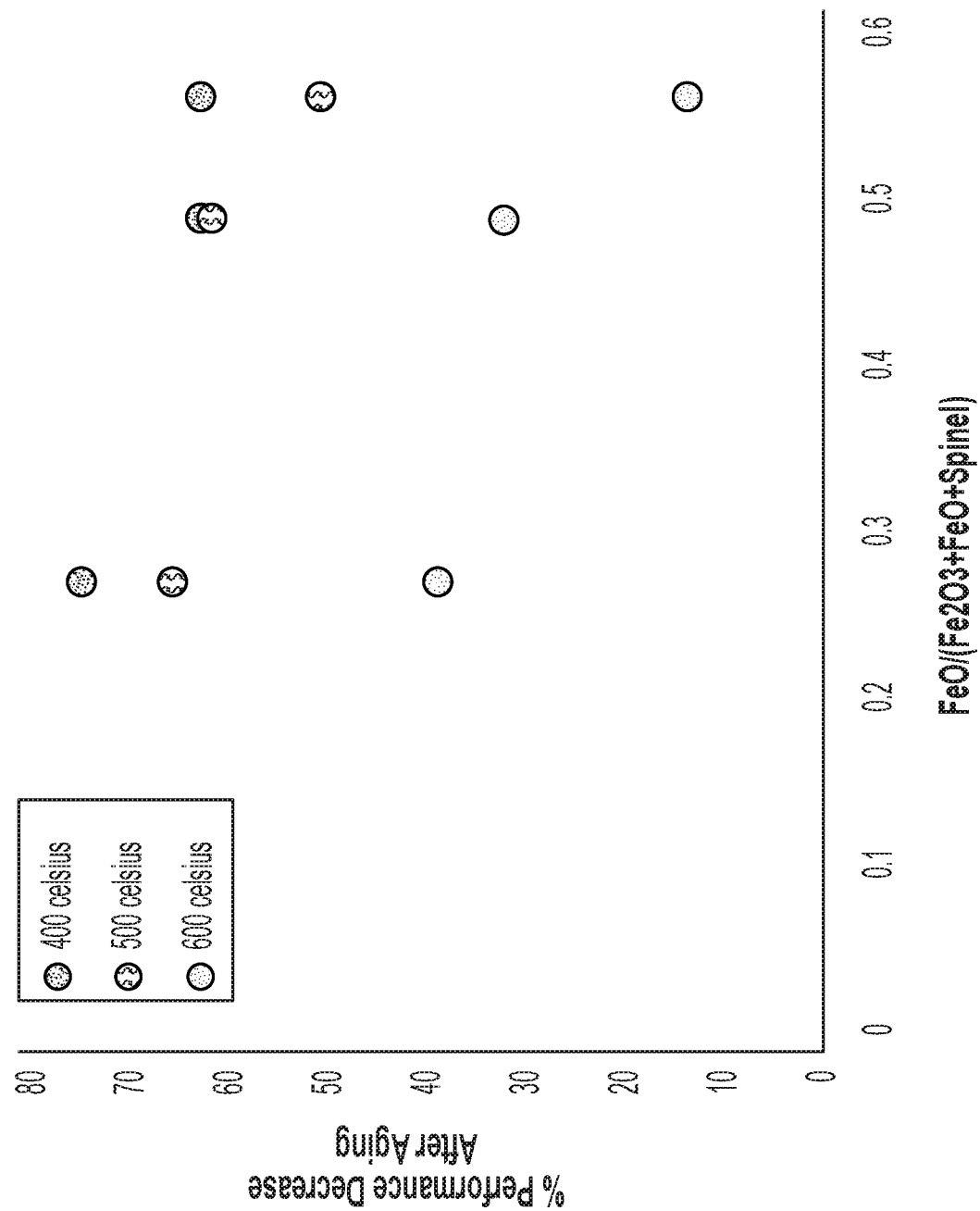
FIG. 7 illustrates the percentage performance decrease after aging as a function of the peak intensity ratio from X-Ray Diffraction of $FeO/(Fe_2O_3+FeO+Spinel)$.

FIGS. 4-6 demonstrate the phase transformations and differences with varying Zn content of the aged materials, as well as the phase composition present after reaction. In general, the Zn concentration suppresses the formation of the difficult to reduce $Fe_2O_3$ phase with more spinel type phase. Without Zn, there is significant $Fe_2O_3$ and very little spinel phase present before the reaction, and the spinel phase is not very intense after the reaction. The Zn=0.9 sample almost completely suppresses the $Fe_2O_3$ formation. The Zn=0.5 sample also contains the most intense FeO reflection after the reaction. FeO ($Fe^{2+}$) readily uptakes oxygen, which may explain why this sample performs the best after aging. Therefore, the cyclability between the FeO type phase and spinel phase is quite important. The proper concentration of Zn appears to retain that cyclability, as demonstrated in FIG. 7.

Figure 8:
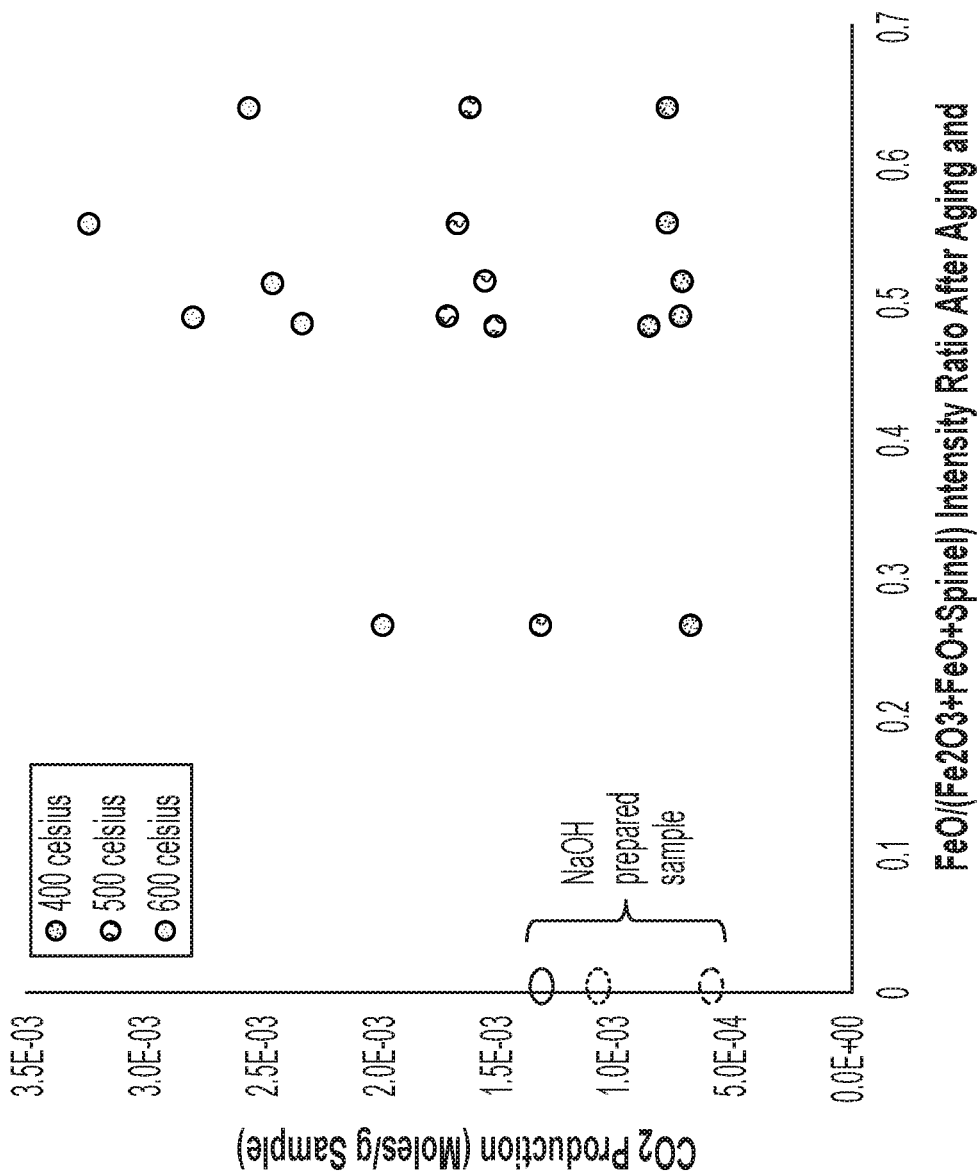
FIG. 8 illustrates OSC performance as a function of the peak intensity ratio after aging and reaction from X-Ray Diffraction of $FeO/(Fe_2O_3+FeO+Spinel)$ for a sample prepared by using NaOH as the precipitation agent compared to a sample prepared using $Na_2CO_3$ as the precipitation agent.

FIG. 8 shows a comparison of the OSC performance as a function of the peak intensity ratio after aging and reaction for a sample prepared by using NaOH as the precipitation agent and a sample prepared using $Na_2CO_3$ as the precipitation agent. As can be seen from FIG. 8, the sample prepared by using NaOH as the precipitation agent (open circle) which has the same nominal composition as the sample prepared using $Na_2CO_3$ as the precipitation agent, it has less performance because the spent material contains little to no FeO phase at about 60° 2Θ in the XRD pattern. FeO is an important phase to be able to reversibly cycle to and from to maintain high OSC ($CO_2$ production) because all Fe is $Fe^{2+}$ and is able to therefore take up the most oxygen.

Figure 9:
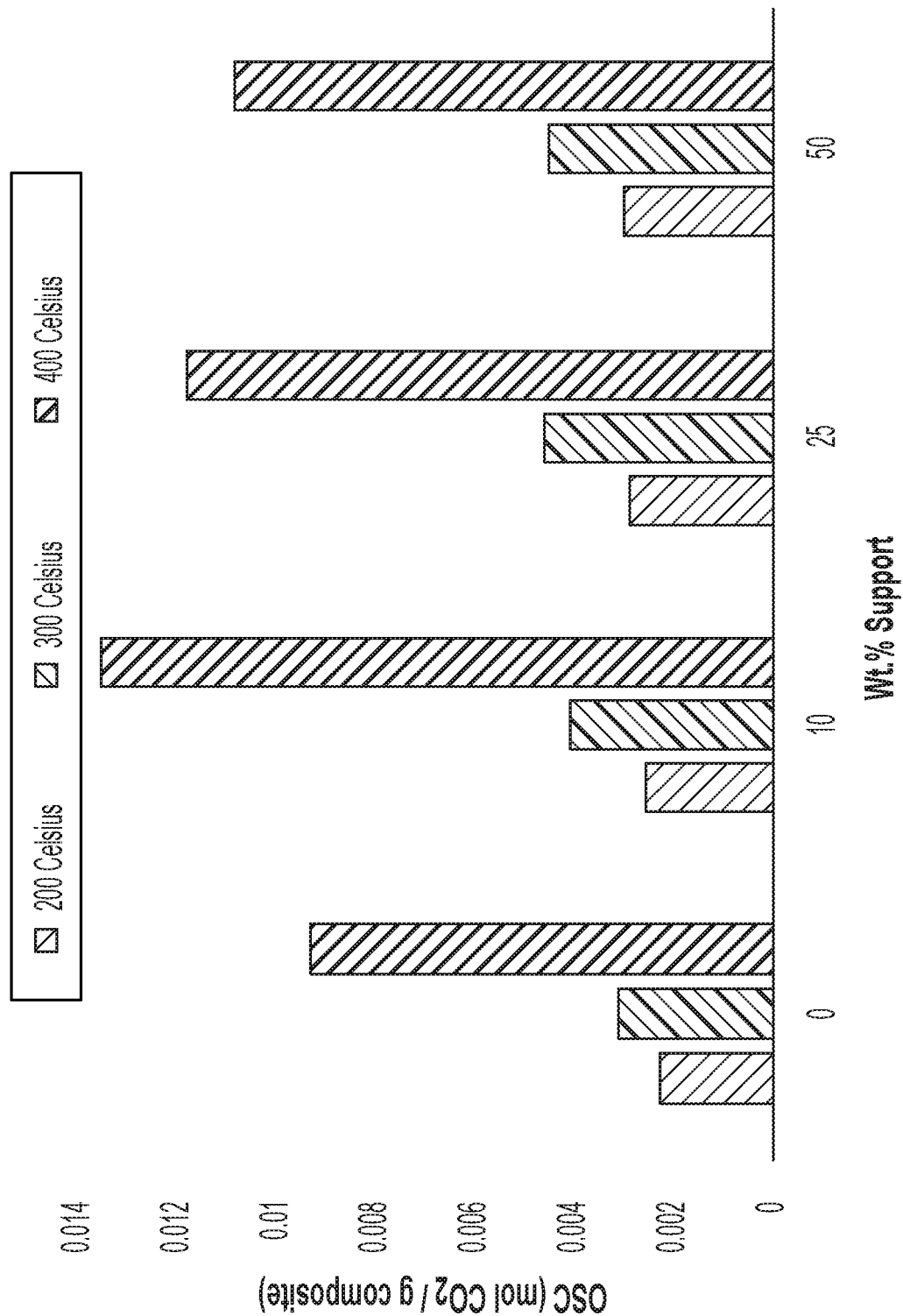
FIG. 9 illustrates low temperature OSC performance at various temperatures from 200-400° C. after aging of materials synthesized by NaOH or $Na_2CO_3$ precipitation on an alumina support.
Figure 10:
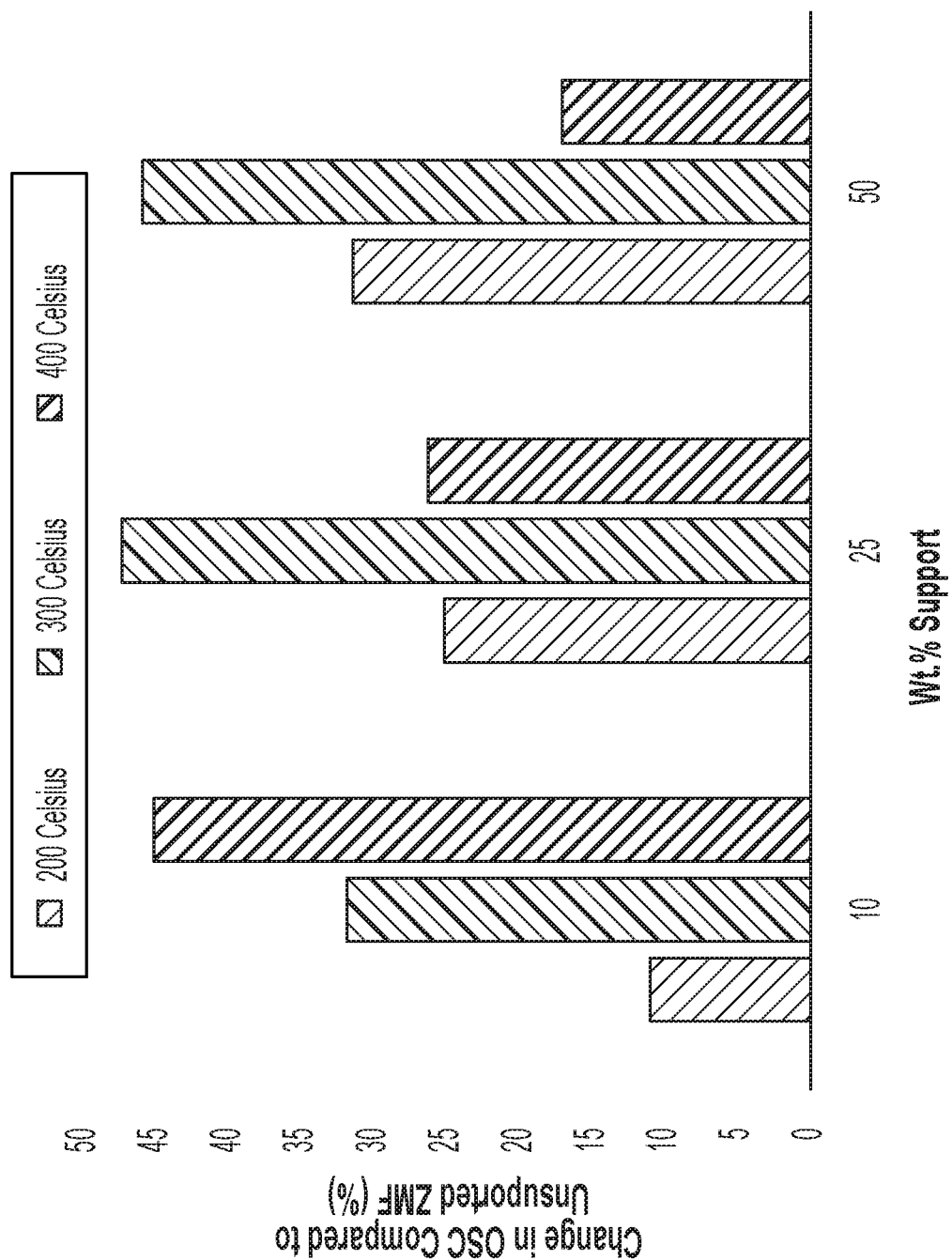
FIG. 10 illustrates low temperature OSC performance at various temperatures from 200-400° C. after aging of unsupported samples of materials synthesized by NaOH or $Na_2CO_3$ precipitation on an alumina support.
Figure 11:
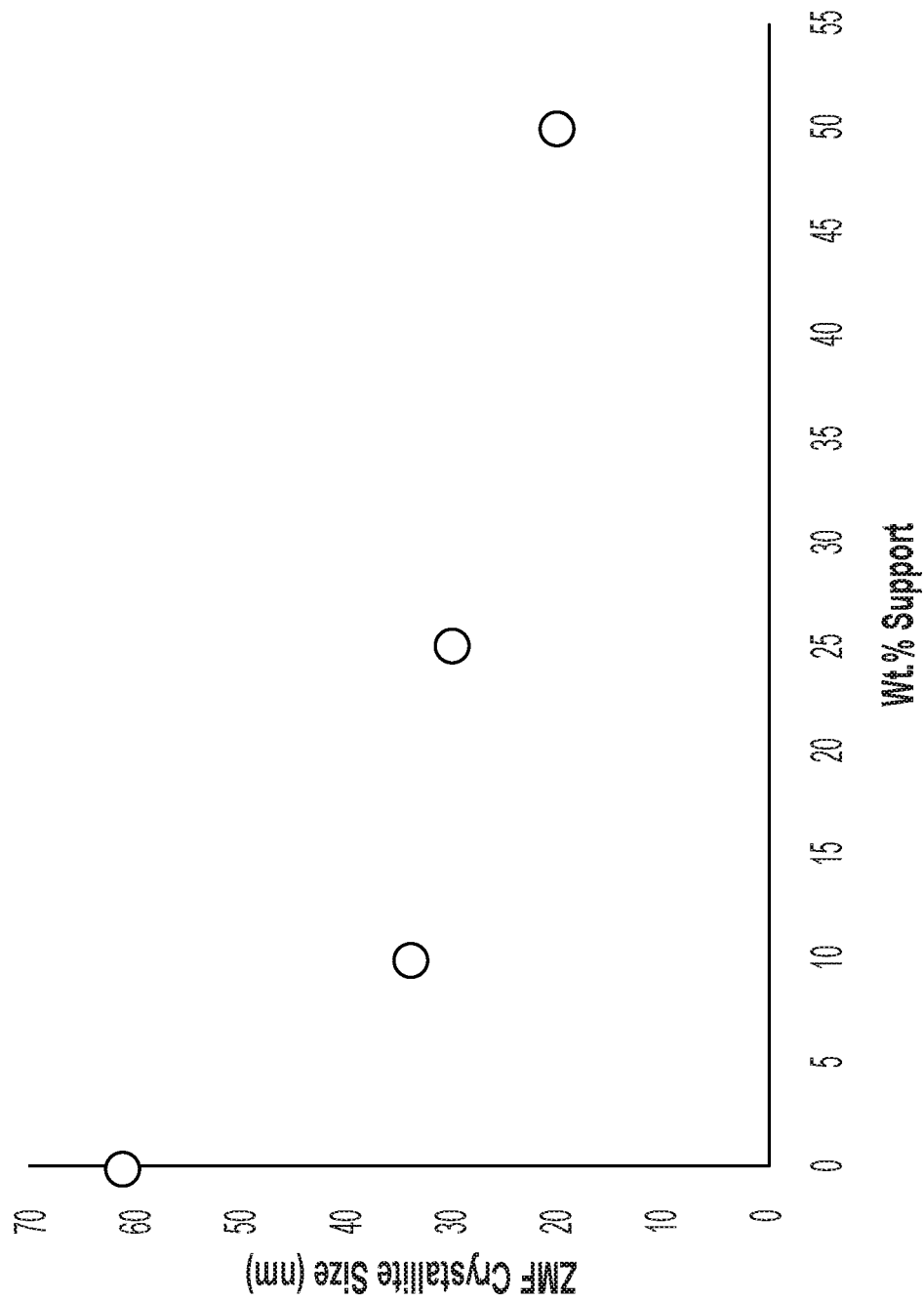
FIG. 11 illustrates crystallite size of the zinc-manganese iron spinel oxide material from X-Ray Diffraction as a function of the wt % of the support.

FIG. 9 illustrates low temperature OSC performance at various temperatures from 200-400° C. after aging of materials synthesized by NaOH or $Na_2CO_3$ precipitation on an alumina support. FIG. 10 illustrates low temperature OSC performance at various temperatures from 200-400° C. after aging of unsupported samples of materials synthesized by NaOH or $Na_2CO_3$ precipitation on an alumina support. A comparison of FIGS. 9 and 10 show that supporting the zinc doped manganese-iron oxide spinel on an alumina support improves low temperature OSC performance after air-aging which is due to the mitigation of $Fe_3O_4$ crystallite size. FIG. 11 illustrates crystallite size of the zinc-manganese iron spinel oxide material from X-Ray Diffraction as a function of the wt % of the support. Smaller zinc doped manganese-iron oxide spinel materials readily participate in redox cycles at lower temperature than larger zinc doped manganese-iron oxide spinel materials.

The zinc doped manganese-iron spinel mixed oxide material of the present disclosure can be used in a chamber or enclosure, such as a catalytic converter having and inlet and an outlet. As is commonly known to those of ordinary skill in the art, such a chamber or enclosure can be configured to receive an exhaust gas stream through the inlet and to exit the exhaust gas stream through the outlet such that the exhaust gas stream has a particular defined flow chamber direction.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A catalyst for oxygen storage applications comprising a zinc doped manganese-iron spinel mixed oxide material obtained by a co-precipitation method using a precipitation agent comprising sodium carbonate ($Na_2CO_3$).

2. The catalyst according to claim 1, wherein the zinc doped manganese-iron spinel mixed oxide comprises $Zn_xMn_{0.5}Fe_{2.5-x}O_4$, wherein $0<x<0.9$.

3. The method according to claim 2, wherein the zinc doped manganese-iron spinel mixed oxide comprises $Zn_xMn_{0.5}Fe_{2.5-x}O_4$, wherein $0.2<x<0.9$.

4. The catalyst according to claim 3, wherein x is 0.5.

5. The catalyst according to claim 1, further comprising a support selected from the group consisting of $Al_2O_3$, $SiO_2$, and $TiO_2$.

6. The catalyst according to claim 5, wherein the support is an alumina ($Al_2O_3$) support.

7. The catalyst according to claim 6, wherein the alumina is stabilized with lanthanum.

8. The catalyst according to claim 1, wherein said catalyst has enhanced oxygen storage capacity before and after aging at 1000° C.

9. A method for making a zinc doped manganese-iron spinel mixed oxide material by a co-precipitation method, the method comprising:
   mixing manganese, iron, and zinc precursor aqueous solutions;
   adding sodium carbonate ($Na_2CO_3$) as a precipitating agent to obtain a precipitate;
   drying the obtained precipitate; and
   calcining the dried precipitate.

10. The method according to claim 9, wherein the zinc doped manganese-iron spinel mixed oxide comprises $Zn_xMn_{0.5}Fe_{2.5-x}O_4$, wherein $0<x<0.9$.

11. The method according to claim 10, wherein the zinc doped manganese-iron spinel mixed oxide comprises $Zn_xMn_{0.5}Fe_{2.5-x}O_4$, wherein $0.2<x<0.9$.

12. The method according to claim 11, wherein x is 0.5.

13. The method according to claim 9, wherein the manganese precursor solution comprises manganese nitrate ($Mn(NO_3)_2$).

14. The method according to claim 9, wherein the iron precursor solution is selected from iron nitrate ($Fe(NO_3)_3$ and Fe(II) chloride ($FeCl_2$).

15. The method according to claim 9, wherein the zinc precursor solution comprises zinc nitrate ($Zn(NO_3)_2$).

16. The method according to claim 9, wherein the calcining is conducted at a temperature of from about 500-1000° C.

17. The method according to claim 16, wherein the calcining is conducted for a time of about 2 to 50 hours.

18. A method of treating an exhaust gas from an internal combustion engine, the method comprising:
   contacting the exhaust gas with a zinc doped manganese-iron spinel mixed oxide catalyst material obtained by a deposition co-precipitation method using sodium carbonate ($Na_2CO_3$) as a precipitation agent according to claim 1, wherein said catalyst material comprises $Zn_xMn_{0.5}Fe_{2.5-x}O_4$, wherein $0<x<0.9$, and a support selected from the group consisting of $Al_2O_3$, $SiO_2$, and $TiO_2$.

19. A catalytic converter, comprising:
   a body defining a chamber, the body having an inlet to receive an exhaust gas stream into the chamber, and an outlet to allow the exhaust gas stream to exit the body; and
   a catalyst material arranged in chamber for direct decomposition removal of $NO_x$ from exhaust gas stream, the catalyst material comprising a zinc doped manganese-iron spinel mixed oxide material obtained by a deposition co-precipitation method using sodium carbonate ($Na_2CO_3$) as a precipitation agent according to claim 1, wherein said catalyst material comprises $Zn_xMn_{0.5}Fe_{2.5-x}O_4$, wherein $0<x<0.9$, and a support selected from the group consisting of $Al_2O_3$, $SiO_2$, and $TiO_2$.

* * * * *